United States Patent
Chandrayana et al.

(10) Patent No.: US 7,467,224 B2
(45) Date of Patent: Dec. 16, 2008

(54) LOAD BALANCING TECHNIQUES FOR INTER-DOMAIN TRAFFIC ENGINEERING

(75) Inventors: Kartikeya Chandrayana, Troy, NY (US); Matthew Roughan, Morristown, NJ (US); Subhabrata Sen, Chatham, NJ (US); Yin Zhang, Lake Hiawatha, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 869 days.

(21) Appl. No.: 10/781,542

(22) Filed: Feb. 17, 2004

(65) Prior Publication Data

US 2005/0182849 A1  Aug. 18, 2005

(51) Int. Cl.
G06F 15/16 (2006.01)
(52) U.S. Cl. ...................... 709/238; 709/240
(58) Field of Classification Search ................. 718/105; 709/241, 238
See application file for complete search history.

(56) References Cited

U.S. PATENT DOCUMENTS

| 6,507,872 | B1 | 1/2003 | Geshwind | |
|---|---|---|---|---|
| 6,581,105 | B2 | 6/2003 | Miloslavsky et al. | |
| 6,831,895 | B1 * | 12/2004 | Ji et al. | 370/237 |
| 6,963,927 | B1 * | 11/2005 | Lee et al. | 709/241 |
| 2004/0193728 | A1 * | 9/2004 | Doshi et al. | 709/238 |

OTHER PUBLICATIONS

"Analytical Framework for Dynamic Traffic Partitioning in MPLS Networks," Dinan et al., *ICC 2000*, 2000 IEEE International Conference on Communications. Conference Record. New Orleans, La, Jun. 18-22, 2000, IEE International Conference on Communications, New York, NY : IEEE, US, vol. 3 of 3, Jun. 18, 2000, pp. 1604-1608, XP001208682, ISBN: 0-7803-6284-5.

"An approach to path-splitting in multipath networks," Krishnan et al., *Proceedings of the International Conference on Communications (ICC)*, Geneva, May 23-26, 1993, New York, NY : IEEE, US, vol. 3, May 23, 1993, pp. 1353-1357, XP010137109, ISBN: 0-7803-0950-2.

"MATE: multipath adaptive traffic engineering," Elwalid et al., *Computer Newworks, Elsevier Science Publishers B.V.*, Amsterdam, NL, vol. 40, No. 6, Dec. 20, 2002, pp. 695-709, XP004397049, ISBN : 1389-1286.

"Fast Accurate Computation of Large-Scale IP Traffic Matrices from Link Loads," Yin Zhang et al., *Sigmetrics 03*, Jun. 10, 2003, XP002324089, San Diego, CA, USA.

* cited by examiner

*Primary Examiner*—Jason Cardone
*Assistant Examiner*—Ryan J Jakovac
(74) *Attorney, Agent, or Firm*—Hoffmann & Baron, LLP

(57) ABSTRACT

A method for balancing traffic across paths connecting a network to the Internet using a fractional allocation strategy for distributing the traffic from a congested selected path. The strategy includes: (a) associating the paths j with a counter i; (b) calculating the total initial selected path overload; (c) calculating the selected path load, wherein the load is equal to the initial selected path overload less the sum of the low capacity boundary for i path(s); (d) calculating the portion of the traffic on the selected path to be distributed using a bi-sectional search strategy; (e) distributing a portion of the traffic on the selected path to the other paths; and (f) stopping if there are no more paths (i=j), otherwise increasing the numerical value of the counter by one (1) and go to step (c).

7 Claims, 12 Drawing Sheets

LOAD BALANCING TECHNIQUES FOR INTER-DOMAIN TRAFFIC ENGINEERING

BACKGROUND OF INVENTION

The present invention relates to a method for the management of inter-domain traffic over the Internet. In particular, the present invention relates to methods for selecting the most efficient and uncongested paths for inter-domain traffic.

A major challenge for inter-domain traffic engineering is the level of uncertainty an Internet Service Provider (ISP) is facing when selecting paths for Internet traffic. With many potentially competing ISPs, global coordination of Internet traffic to select the best path and minimize congestion can be difficult. Moreover, a single ISP only has limited knowledge about user demand, available network resources, and routing policies at the peers.

One of the major problems encountered in inter-domain traffic engineering is appropriately reacting to congestion, losses, and/or delays experienced by traffic between a home network and other domains. This problem is encountered in a home network with multiple links into another domain, such as large ISPs with multiple peering links to another backbone, or a smaller local network multi-homed to two or more backbones. In such cases, the company paying for these links may find that, under normal policies, traffic exiting the home network through one of the links is experiencing congestion, while other links are under-utilized. In some cases, the congestion experienced by traffic leaving or entering the home network may actually occur outside its domain. In order to improve the performance experienced by the connections generating the associated traffic, the ISP operator needs to find a way to alleviate the congestion, losses and/or delays.

In simple cases, where the congestion is on the home network's egress link, congestion may be detected via Simple Network Management Protocol (SNMP) traffic measurements. SNMP is a set of protocols for managing complex networks which was first used in the 1980s. SNMP works by sending messages, called protocol data units (PDUs), to different parts of a network. SNMP-compliant devices, called agents, store data about themselves in Management Information Bases (MIBs) and return this data to the SNMP requesters. A user can determine an alternate route for the traffic by using SNMP to measure the available capacity on the alternate egress links. Under such circumstances, there are any number of approaches to the problem of load balancing the traffic with the only real problem being the way it is implemented because typical inter-domain routing using Border Gateway Protocol (BGP) is a relatively coarse mechanism for traffic engineering.

A variety of metrics can also be used when a user is trying to determine the best path to use for sending traffic over a network. Some routing protocols, such as Routing Information Protocol (RIP), use only one metric and that is hop count. And some routing protocols, such as Interior Gateway Routing Protocol (IGRP), use a combination of metrics. The metrics most commonly used are: (1) hop count—the number of routers that a packet must go through to reach its destination; (2) bandwidth—the data capacity of a link; (3) delay—the length of time to move the packet from the source to destination; (4) load—the amount of activity on a network resource; (5) reliability—the error rate of each network link; (6) ticks—the delay on a data link using IBM PC clock ticks; and (7) cost—an arbitrary value assigned by an administrator. The best route depends on the metrics and metric weightings used to make the calculation. For example, one routing protocol might use the number of hops and the delay, but might weigh the delay more heavily in the calculation. Thus, a route having more hops and shorter delays may be less expensive than a route having fewer drops and longer delays. Paths that are expensive to use are usually avoided. Such metrics are a useful tool but they cannot accurately account for traffic in other domains.

Leaving aside the practical problems of implementing a method for balancing the traffic load, there is a more fundamental problem. In some cases, the congestion experienced by traffic leaving or entering the home network may actually occur outside the domain so that the operator is unable to make direct observations of the traffic along different paths. Indeed, the operator's knowledge is limited to the home network and he or she does not necessarily know the routing, topology, or capacity of the network that the traffic traverses. However, the operator can often still detect congestion in the network using active probes, and the operator may want to take remedial actions to alleviate or avoid this congestion.

If the operator chooses to alleviate or avoid congestion that is detected on the network, he or she must balance loads across multiple paths without knowledge of the available capacity and the details of the paths themselves. The only information available to the operator are coarse measurements of statistics (such as loss rate) and Round Trip Time (RTT), which can be used to infer congestion. In addition, the operator may be able to use some of the more recently developed techniques to estimate bottleneck bandwidth, for example, an approach based on network tomography. These mechanisms are unlikely to give an entirely accurate picture of the paths in question, but can narrow down the range of possibilities.

A further, and even more difficult problem, is that multiple operators may decide to use similar approaches to avoid congestion and may be simultaneously rerouting their traffic. In this case, they will play a kind of "game" against each other to optimize the utilization of the external domain, not knowing that other operators are changing traffic paths. Based on past experience, it has been found that such "games" (where individuals optimize their own utility) do not always lead to the global optimal behavior.

Accordingly, there is a need for a method which allows the network operator to ease congestion and to balance the loads on the network paths. More specifically, there is a need for a method which allows the operator to estimate the amount of traffic across different paths in a network on a fairly accurate basis and to reroute some of the traffic to uncongested network paths.

SUMMARY OF THE INVENTION

In accordance with the present invention, a method for balancing traffic across paths connecting a network to the Internet is provided. The method includes forming a connection between a home network and a large network which connects to a plurality of networks. The connection from the home network to the larger network includes a plurality of paths carrying traffic in the form of data packets and each path has a path load. One of the paths is selected from the plurality of paths which includes the selected path and other paths. The selected path has a traffic load and an initial overload. Each path connecting the home network to the larger network has a path load and the selected path has a traffic load and an initial overload. In a preferred embodiment, the home network is an internet service provider (ISP) and the larger network is the Internet. The method includes measuring the amount of traffic from the home network to the large network over the selected path, the congestion over the selected path and the available capacity over the selected path. The method also includes choosing the path load for each of the plurality of paths using a fractional allocation strategy, wherein the time to generate information is minimized and the amount of traffic lost to overloads is minimized and distributing a portion of the traffic from the selected path to the other paths based on the fractional allocation strategy.

In a preferred embodiment of the present invention, the fractional allocation strategy includes the steps of: (a) associating the paths with a counter i, wherein the counter is a number equal to one (1) and there are a total of j paths; (b) calculating the total initial selected path overload; (c) calculating the selected path load, wherein the load is equal to the initial selected path overload less the sum of the low capacity boundary for i path(s); (d) calculating the portion of the traffic on the selected path to be distributed using a bi-sectional search strategy, preferably a multidimensional iterative bisection search algorithm; (e) distributing a portion of the traffic on the selected path to the other paths; and (f) stopping if there are no more paths (i=j), otherwise increasing the numerical value of the counter by one (1) and go to step (c).

In another preferred embodiment of the present invention, the portion of the traffic is distributed to the other paths using the equation $$x_i = l_i + \frac{h_i - l_i}{\sum_{i=1}^{P}(h_i - l_i)} \times \left(x_0(0) - \sum_{i=1}^{P} l_i\right), \quad (1)$$

wherein $x_i$ is the path load, $l_i$ is low capacity boundary, $h_i$ is high capacity boundary, P is the total number of paths and $x_0(0)$ is the initial overload on the selected path.

The cost for using a path connecting the home network to the larger network is measured using the equation $$C = \sum_{t=1}^{T} \sum_{i=0}^{P} [x_i(t) - c_i(t)]^+,$$

wherein C is the cost, T is the time period over which the feasible solution is obtained, P is the number of paths between the home network and the large network, x is path load and c is the capacity of the path at time t.

In preferred embodiments, the amount of traffic from the home network to the large network over the selected path is measured using flow level measurements or Simple Network Management Protocol (SNMP). The congestion over the selected path is measured using active probes, passive measurements of traffic details Transmission Control Protocol (TCP) Synchronize/Acknowledgement (SYN/ACK) response time or Round Trip Time (RTT), and loss measurements. And the available capacity over the selected path is measured using flow level measurements, Simple Network Management Protocol (SNMP) link measurements, Round Trip Time (RTT), loss measurements, active probes, or Transmission Control Protocol (TCP) Synchronize/Acknowledgement (SYN/ACK) response time.

The method of the present invention allows a local network operator, such as an ISP, to balance traffic loads across paths connecting the local network to the Internet and minimize congestion and improve efficiency.

BRIEF DESCRIPTION OF THE FIGURES

Other objects and many attendant features of this invention will be readily appreciated as the invention becomes better understood by reference to the following detailed description when considered in connection with the accompanying drawings wherein.

DETAILED DESCRIPTION OF THE INVENTION

Figure 1:
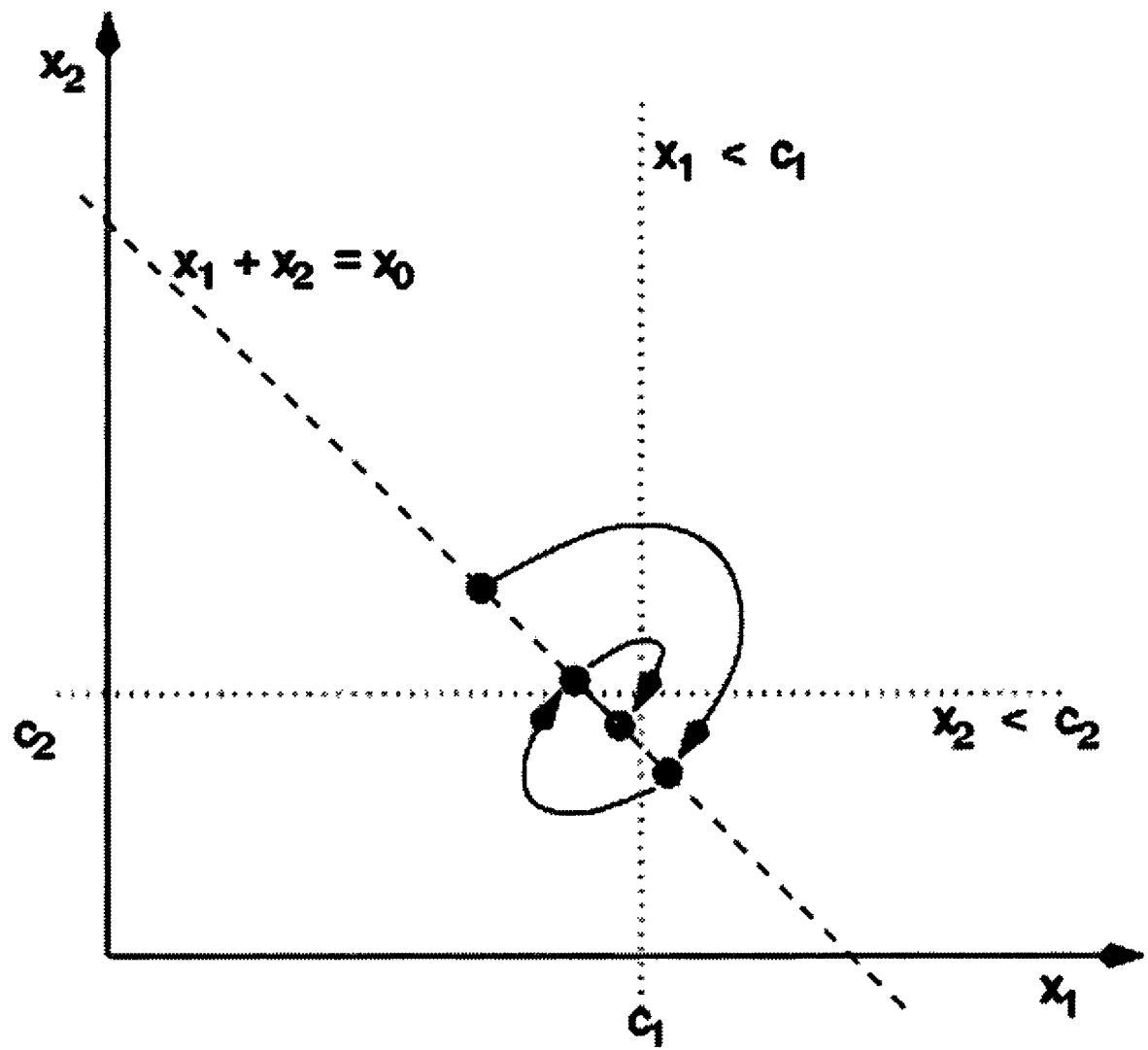
FIG. 1 is a graph which illustrates the two-dimensional (2-d) case for the multidimensional iterative bisection search (MIBS) method.
Figure 2A:
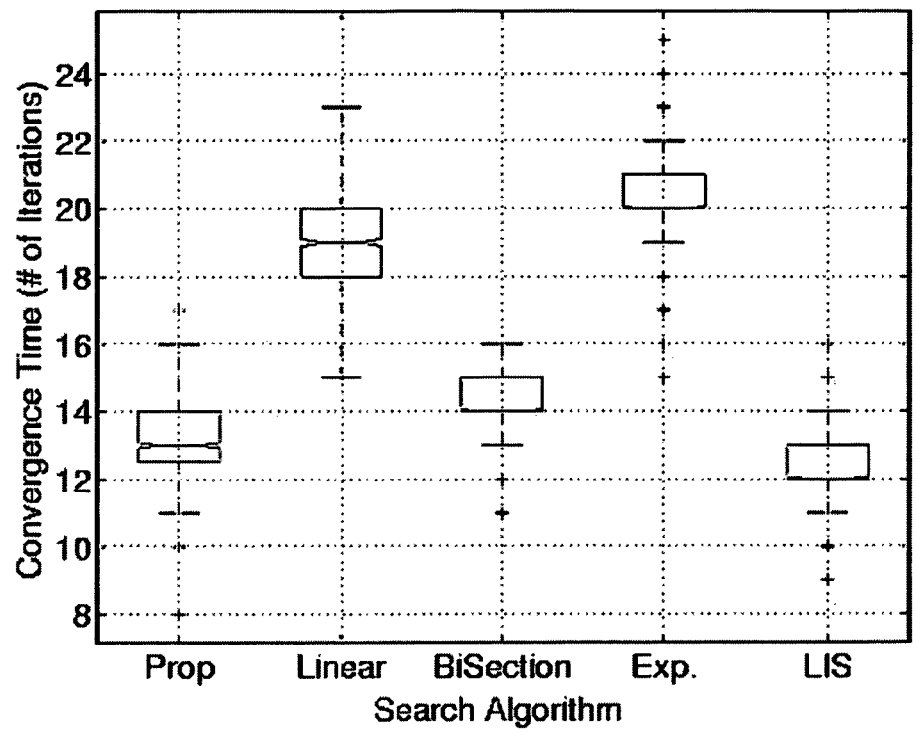
FIG. 2A is a bar graph showing a comparison of different search schemes based on convergence time when $x_0=10,000$ and $\omega=1.00$.
Figure 2B:
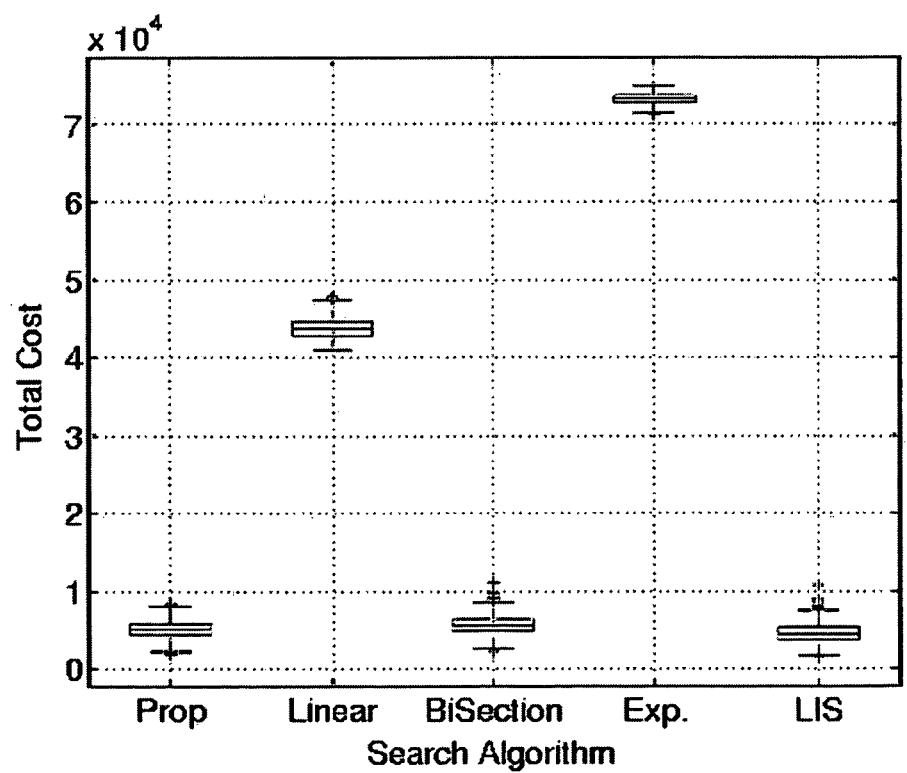
FIG. 2B is a bar graph showing a comparison of different search schemes based on total cost when $x_0=10,000$ and $\omega=1.00$.
Figure 3A:
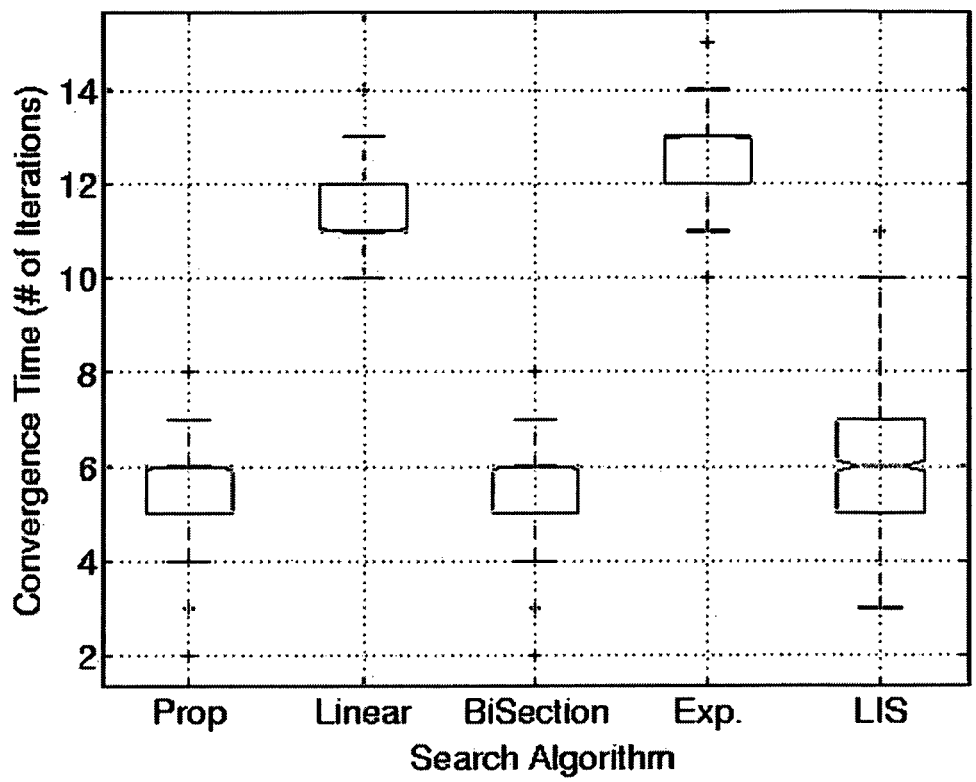
FIG. 3A is a bar graph showing a comparison of different search schemes based on convergence time when $x_0=10,000$ and $\omega=1.05$.
Figure 3B:
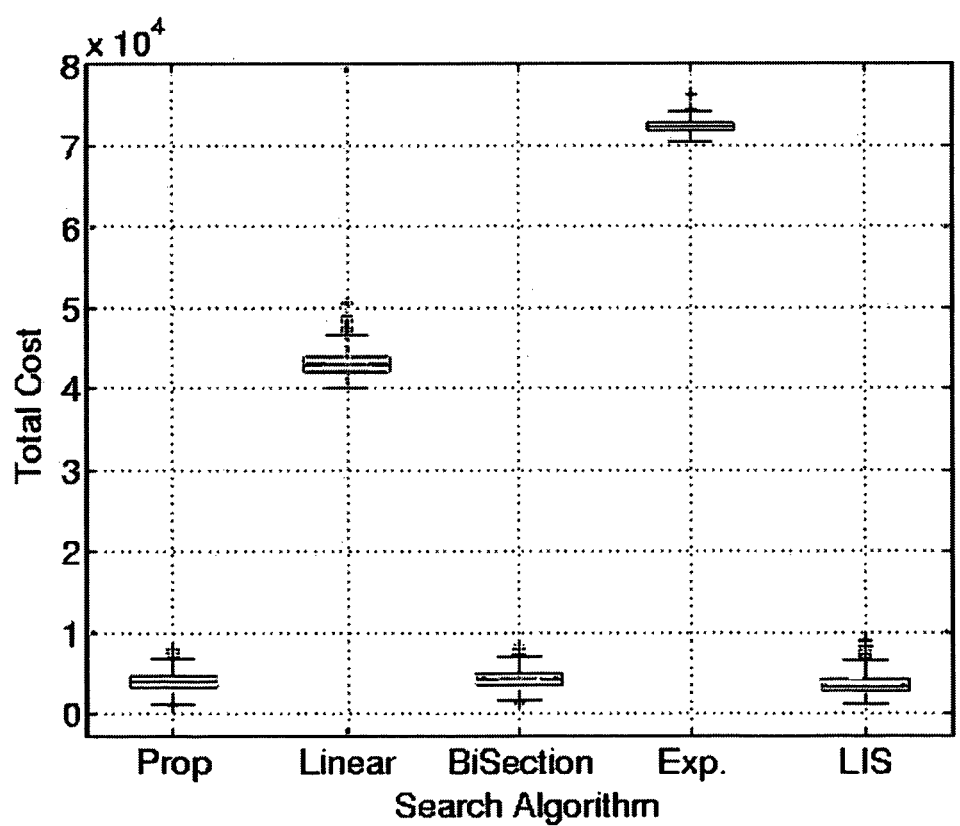
FIG. 3B is a bar graph showing a comparison of different search schemes based on total cost when $x_0=10,000$ and $\omega=1.05$.

The present invention is a method for balancing traffic on a network when the operator does not have complete information about the operating and performance characteristics of the network. In order to balance network traffic, it is desirable for the home network operator to be able to move at least some traffic to uncongested network paths to ease congestion. For the present application, the term "home network" refers to the network, such as an ISP network, for which the operator is balancing the traffic entering and exiting.

A major challenge for inter-domain traffic engineering is the level of uncertainty that the operator of an ISP faces. With many potentially competing ISPs, global coordination can be difficult simply because of the size of the network. A single ISP only has limited knowledge about user demand, available network resource, and routing policies at the peers. In addition, the operator has limited control over how the traffic is routed external to its domain, the home network. However, the ISP operator can determine how (i.e., at what links) the traffic exits its domain by using various tools such as Border Gateway Protocol (BGP). The present invention utilizes the capability to select home network exit links and provides methods for traffic load balancing in the case where the network service provider possesses limited knowledge about user demand, available network resources, and the routing policies used on network paths. In particular, the present invention provides algorithmic techniques for determining how traffic loads are shifted from congested links to uncongested links with unknown available capacities.

In order to implement the method of the present invention, three types of measurements must be available to the home network operator: (1) the traffic contribution of the home network to any one path; (2) the congestion on the paths connecting the ISP to the network; and (3) the available capacity on a path.

The home network operator must be able to measure the traffic contribution of the home network to any one path. This can be done by the home network operator fairly precisely, at whatever level is necessary, either using flow level measurements, or SNMP link measurements when it is equivalent to path traffic.

The home network operator must be able to measure congestion (inferred from Round Trip Time (RTT), and loss measurements) using active probes, or passive measurements of traffic details such as the Transmission Control Protocol (TCP) Synchronize/Acknowledgement (SYN/ACK) response time. (TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent.) Such measurements will, by their statistical nature, contain false positives and false negatives which will have to be factored into the calculations.

The home network operator must be able to measure the available capacity on a path. These measurement scan be obtained using flow level measurements, SNMP link measurements, RTT, loss measurements, active probes, or passive measurements of traffic details, such as the Transmission Control Protocol (TCP) Synchronize/Acknowledgement (SYN/ACK) response time. However, these measurements are less accurate for measuring path capacity than they are for measuring the traffic contribution of the home network and congestion. Therefore, they are only used to obtain approximate bounds on the available capacity of a path. A worst case estimate of the bounds on the capacity of a path would be $[0,f_i]$, where $f_i$ is the capacity of the first hop link, leaving the home network.

The method of the present invention is based on the assumption that there are P+1 egress paths from the home network and that 1 is congested. The paths are indexed by I $\in \{0, 1, \ldots, P\}$. On each path, $p_i$, at time t, it is assumed that there is available capacity, $c_i(t)$, which can vary over time due to changes in cross-traffic along the path of interest. In general, the available capacity, $c_i$, is not known, except for some bounds, $c_i(t) \in [l_i(t), h_i(t)]$, obtained through measurements. For the methods described herein, this interval is called the pinning interval, $\alpha$.

The traffic being sent to a specific path can be directly measured and it is denoted as $x_i$ while, without the loss of generality, the congested path is denoted as path "0." It is assumed that the capacity over the congested path, $c_0$, is known precisely—the problem can be simply generalized if not, by including $x_0$ in the processes below. Under such assumptions, a simple transformation allows the problem to be considered, where $c_0 \leftarrow 0$ and $x_0 \leftarrow x_0 - c_0$, so that $x_0$ is now the excess load that needs to be distributed in order to alleviate congestion.

The congestion indications are denoted by indicator functions, where $$C_i(t) = \begin{cases} 1, & \text{if path } i \text{ is congested at } t, \\ 0, & \text{otherwise.} \end{cases}$$

The method of the present invention uses an infinite buffer model in which the amount of traffic dropped is modeled as the excess load, $d_i(t)=[x_i(t)-c_i(t)]^+$, where $[\ldots]^+$ denotes the positive part. This condition can be relaxed if the appropriate measurements to take such details into account are available. However, such measurements (for instance packet traces) are rarely available in practice.

The above statement also assumes that the time intervals, t=1, 2, 3, . . . , are sufficiently far apart that transient effects from changes, for instance in the offered loads (i.e., the traffic sent to a path, $x_i(t)$), need not be considered and that congestion indications are instantaneous, though in reality they will always involve some delay. Typically, this delay would be measured in seconds, whereas, the time scale of the algorithm of the present invention can be in the order of minutes. In addition, the individual paths are assumed to be disjointed in the sense that they do not share bottlenecks. Otherwise, the paths sharing the bottleneck could be incorporated into one, larger path.

Statement of the Problem

The method of the present invention provides an iterative algorithm that uses congestion indication measurements alone to determine a feasible solution to a load balancing problem. If a load balancing problem does not exist, the method will find the minimal cost solution. A minimal cost solution is found to be feasible if $$x_i(t) \le c_i(t), \forall\, i = 0, \ldots, P, \forall\, t \ge T,$$

$$\sum_{i=1}^{P} x_i(t) = x_0,$$

where T is the time at which convergence occurs. The minimum average long-term cost solution is the solution that minimizes the average number of packets dropped over time and it can be expressed by the following expression $$\lim_{T \to \infty} \frac{1}{T} \sum_{t} \sum_{i=0}^{P} [x_i(t) - c_i(t)]^+.$$

In addition, if there is a feasible solution, it would be desirable for this solution to satisfy a number of properties. For instance, the solution should have a short convergence time (the time, T, at which the feasible solution is obtained should be as short as possible, both in expectation, and mean) and the solution should drop as few packets as possible so that it has a low cost, where cost is measured by $$C = \sum_{t=1}^{T} \sum_{i=0}^{P} [x_i(t) - c_i(t)]^+.$$

The method does not assume that path traffic equals link traffic on the egress links, so there can be more than one set of paths across which traffic can be balanced.

The Static Case

The first case considered is the static case. In this case, it is assumed that: (1) the network, and cross-traffic loads do not change over time, so that $c_i(t)=c_i$, where $c_i$ is a constant; (2) the traffic is inelastic, and is not directly affected by changes in its routing, or the congestion level; and (3) the congestion indications on each path are always correct.

In the limit where the discretization size B→0, a feasible solution can always be found when $$x_0 \le \sum_{i=1}^{P} c_i.$$

As the discretization increases, there may be cases where this relationship is satisfied, but there is no feasible solution. In order for a feasible solution to exist, a necessary and sufficient condition is that $$x_o \le \sum_{i=1}^{P} \lfloor c_i / B \rfloor \times B,$$

where [x] denotes the largest integer less than x. If the capacity is discretized with the same quantization, B, as the traffic, then the two conditions are equivalent.

Where there is no feasible solution, the minimum long-term cost solution is any one for which all of the paths 1, . . . , P are congested. Any of these solutions will be equivalent with respect to long-term cost (as defined above). Since it is relatively easy to find such solutions, these cases are not addressed.

When there is no feasible solution, a different cost metric is used. For example, it may be desirable to have congestion on as few paths as possible to reduce the number of users impacted by congestion, or it may be more desirable to have moderate levels of congestion on all paths, rather than a single path with high congestion. However, before alternate approaches are discussed, the solution for the static case is found.

Under the conditions for the static case, the bounds of the capacity estimates can be tightened after each time interval. For example $$l_i(t+1)=\max\{l_i(t), x_i(t)\},\ C_i(t)=0,$$

$$h_i(t+1)=\min\{h_i(t), x_i(t)\},\ C_i(t)=1.$$

If the path is congested, then the available capacity on that path is less than the currently used capacity, whereas, if the path is uncongested, the available capacity is at least what is currently being used. In the discrete case, slightly better bounds can be obtained by taking $$h_i(t+1)=\min\{h_i(t), x_i(t)-B\},\ C_i(t)=1,$$

because $x_i$ can only be changed in multiples of B.

The problem is to choose the traffic sent to a path (also referred to herein as traffic path load or path load), $x_i(t)$, at each time interval, t, so that the total load to be distributed, $x_0(0)$, is spread across paths 0, . . . , P, and converges (with as low a cost as possible) to a feasible solution, one in which $x_i(t) \le c_i(t)$, $\forall_i$. By choosing $x_i(t+1) \in (l_i(t+1), h_i(t+1))$, it is possible to generate additional information that can be used in the next iteration to refine the bounds for the possible capacities, $c_i$. Either the low capacity boundary, $l_i$, can be increased, or the high capacity boundary, $h_i$, can be decreased.

The problem is how best to choose the traffic load sent to a path, $x_i$, so as to generate information as quickly as possible, while at the same time reducing the probability that traffic will be lost to overloads. Several different strategies can be used to approach this problem and they are described below. In each case, the algorithm is terminated at the point when either a feasible solution is reached, or all links are congested. Convergence is guaranteed by the fact that the allowable region $[l_i, h_i]$ will decrease at each time step as long as at least one $x_i \in (l_i, h_i)$ is chosen.

Proportional Allocation

One embodiment of the present invention approaches the problem of choosing the traffic load sent to a particular path by trying to minimize the expected losses at each iteration of the algorithm. Given no other information, the simplest assumption that can be made is that the available capacity on each path is uniformly distributed between the bounds, that is, $c_i \sim U[l_i(t), h_i(t)]$, at some time, t. In fact, each measurement may be considered to provide more information than simply the bounds. Therefore, the most reasonable distribution to use might be something other than the uniform distribution. A preferred embodiment of the present invention uses the following allocation of $x_i$ $$x_i = l_i + \frac{h_i - l_i}{\sum_{i=1}^{P}(h_i - l_i)} \times \left(x_0(0) - \sum_{i=1}^{P} l_i\right), \quad (1)$$

This method is referred to in the present invention as "proportional allocation." The reason for selecting the name can be seen in the simple case where $l_i=0$, $\forall_i$. In this case, the allocations to each path will be proportional to the high boundary, $h_i$, for that path.

In the discrete case, the path loads, $x_i$, must be multiples of the block size B. The algorithm can take several forms, but a simple approach is to take the $x_i = B \times \lfloor x_i/B \rfloor$, and then to take the remaining load, and distribute it in a round-robin fashion between the paths.

The final algorithm then proceeds in a series of steps. The initial algorithm uses coarse bandwidth estimates for the low, $l_i(0)$, and high, $h_i(0)$, boundaries, and then proceeds by choosing the path load, $x_i$, as in equation (1). Once congestion has been measured on each path, the bounds are updated, and the steps are repeated, until either a feasible solution is reached, or all paths are congested. Although this approach minimizes the expected cost at each step, it does not minimize the overall cost. Such a minimization also needs to reduce the boundary intervals $[l_i, h_i]$ as quickly as possible.

Fractional Allocation Strategies

In the proportional allocation method discussed above, it was assumed that the initial path load was zero, $x_0=0$, in order to minimize the cost at each step. Otherwise, $\lambda=-1$, and hence $x_i=h_i$, which yields a value for $x_0$ that is not feasible.

In another embodiment of the present invention called the "Fractional Allocation Strategy," an alternative method is used which does not assume $x_0(t)=0$, $\forall t>0$, but instead assigns only part of the initial path load, $x_0$, to the other paths at each step. Fractional Allocation Strategy corresponds to the strategy where the initial overload on path "0" ($x_0(0)$) or the "selected path" is broken up into smaller segments and once a starting segment size (to be off-loaded and distributed to the other paths connecting the home network to the larger network) has been decided, the subsequent segment sizes are decided based on some rule (e.g., linear, bisection etc.). However, the segments bandwidth can be distributed amongst users according to any criteria, with Proportional Allocation used as the default rule. Algorithm 1, which is shown below, describes the Fractional Allocation scheme.

---

Algorithm 1 -- Fractional Allocation Strategy while !(Feasible Allocation) do
    Update Load as $$\text{Load}(t) = x_0(0) - \sum_{i=1}^{P} l_i(t)$$

Calculate traffic y(t) to be distributed
        y(t) ≦ Load(t)
    according to linear search, bi-section search or exponential search strategy
    Distribute y(t) amongst paths using equation (1)

$$\left(\text{with } \left(x_0(0) - \sum_{i=1}^{P} l_i\right) \text{ replaced by } y(t)\right)$$

---

Algorithm 1 -- Fractional Allocation Strategy

Update pinning intervals $[l_i(t+1), h_i(t+1)]$
end while

---

Three strategies can be used for choosing the traffic to be distributed (y(t)): (1) linear search, (2) bi-section search, and (3) exponential search.

The "linear search" strategy has a parameter STEP_SIZE which is chosen by setting a number of rounds, N, that it will take for the algorithm to converge. Hence, $$\text{STEP\_SIZE} = \frac{x_0(0) - \sum_{i=1}^{P} l_i(0)}{N}.$$

At each iteration, the traffic to be distributed, $y(t)=\min\{\text{STEP\_SIZE}, \text{Load}(t)\}$ of the load is assigned to the paths $i=1, \ldots, P$.

As the algorithm progresses, the traffic being reallocated at each step, y(t), tends to be allocated to uncongested links, and so the lower bounds, $l_i$, on uncongested paths will increase, thereby decreasing the load on path "0" by approximately the STEP_SIZE at each interval, and converging in after about N steps. Essentially, the aim of this approach is to minimize the congestion on paths, $i=1, \ldots, P$. However, this strategy allows ongoing congestion on path "0" to persist for longer periods of time. In some cases, it may be more desirable to allocate traffic this way, for example, when it is necessary to reduce the overall number of dropped packets and to keep the number of congested paths to a minimum at all times.

The "bi-section search" strategy is the preferred strategy of the present invention. The "bi-section search" strategy takes a parameter $0<\alpha<1$, which would typically be 0.5 (thus, giving the search strategy its name) and then performs the algorithm defined by choosing the traffic to be distributed, y(t), that satisfy $$y(t) = \min\left\{\alpha\left[\sum_{i=1}^{P}(h_i(t) - l_i(t))\right], \text{Load}(t)\right\}$$

This approach is intended to allocated the traffic more quickly at the start, and then slows down as the bounds become more narrow. Accordingly, this approach would be expected to converge more quickly than the linear search.

An alternative is the "exponential search" strategy, which is defined by three parameters: EXP_BASE (chosen to be either constant, or a constant fraction of Load), EXP_FACTOR, which is (by default) 2, and ROUND_ID. The traffic to be distributed, y(t), are chosen using $$y(t) = \min\{\text{EXP\_BASE} \times \text{EXP\_FACTOR}^{ROUND\_ID}, \text{Load}(t)\}$$

Multidimensional Iterative Bisection Search

In a preferred embodiment of the present invention, a "multidimensional iterative bisection search" (MIBS) is used wherein the entire initial congested load from path "0" is allocated at each step. This approach is analogous to a traditional binary search, though it is generalized to a higher dimensional, constrained space.

To illustrate the MIBS approach, the simplest, non-trivial case, is considered, where there are P=2 alternate paths across the network boundary which can be used to balance the excess load. The graph in FIG. 1 illustrates this two-dimensional (2-d) case. The graph shows the capacity constraints, $x_1 < c_1$ and $x_2 < c_2$, (vertical and horizontal dotted lines, respectively), and the constraint, $x_1 + x_2 = x_0$, is plotted as a dashed line (the constraint line). The feasible solutions fall on the small solid segment of the constraint line.

The multidimensional iterative bisection search approach can start with zero knowledge of the bounds (i.e., effectively it is assumed that the low and high boundaries equal zero ($l_i = 0$ and $h_i = x_0(0)$) for all i. When better information is obtained about the initial pinning interval($\alpha$), it can be easily exploited. The approach is initialized by using the proportional allocations, which in this (zero knowledge) case assigns equal traffic to paths 1 and 2. The approach proceeds much as a typically binary search would proceed. A new set of pinning intervals is selected based on the constraints that are satisfied. The pinning interval, $\alpha$, (along the constraint line) is then bisected and tested again. This is shown by the series of dots in FIG. 1.

The great advantage of the local search approach is that it provably converges to the feasible region very quickly. Its worst case performance (for the 2-d case) is $T = \log_2(1/L)$, where L is the proportion of the constraint line (in the positive quadrant of $IR^2$), that is feasible. In cases where the solution must be discretized, the smallest feasible region (if one exists) is $L \sim B/\sqrt{2x_0(0)}$, and so the convergence time will increase for larger initial loads, and decrease for larger discretizations (assuming the available capacities are scaled appropriately).

In fact, for the two-dimensional case, if the total available capacity, $$c = \sum_{i=1}^{P} c_i,$$

is no more than the load to be distributed, the multidimensional iterative bisection search is provably optimal. This can be shown by the case where $c = x_0(0)$. In this case, a standard binary search with its normal properties is simply being performed.

---

Algorithm 2 - Multidimensional Iterative Bisection Search

NUM_ITERATIONS: Number of Local Iterations
while! (Feasible Allocation) do
    Allocate Rates Proportionally amongst all paths
    i = 0
    while (I + + < NUM_iterations) do
        Shuffle the list of paths.
        while (! End of List of Paths) do
            Pick an unpicked pair from the List, (Let paths i, j be picked.)
            $s_{ij} = x_i + x_j$
            $LO_i = \max(l_i, s_{ij} - h_j)$
            $HI_i = \min(h_i, s_{ij} - l_j)$
            $LO_j = s_{ij} - HI_i$
            $HI_j = s_{ij} - LO_i$
            $x_i = LO_i + (HI_i - LO_i)/2$
            $x_j = s_{ij} - x_i$
        end while
    end while
end while

---

The disadvantage of the two-dimensional approach is that it is slightly more complicated to generalize the algorithm to higher dimensions. In higher dimensions, it is necessary to run the equivalent of the binary search on a P−1 dimensional manifold embedded in the positive quadrant of $R^P$. The algorithm discussed in the next section is a good approximation to this search.

Modified Multidimensional Iterative Bisection Search

Another embodiment of the present invention, is a modification of MIBS. In the two-dimensional case, MIBS is provably optimal if $c \leq x_0(0)$. However, it is no longer optimal if $c > x_0(0)$. The modified multidimensional iterative bisection search (MMIBS) shown below is provably optimal (in the 2-d case) when the total capacity is given. It is also provably better than MIBS when a true lower bound of the total capacity is known. When $c \leq x_0(0)$, MMIBS behaves exactly as the MIBS algorithm.

---

Algorithm 3 - Modified Multidimensional Iterative Bisection Search if (know true TotalCapacity) then
    estCapacity = TotalCapacity
else
    estCapacity = max(totalDemand, capacityLowerBound)
end if
extra if
extraCapacity = estCapacity − totalDemand
Initialize $l_i$ = 0 and $h_i$ = estCapacity
NUM-ITERATIONS: Number of Local Iterations
while ! (Feasible Allocation) do
    Allocate Rates Proportionally amongst all paths.
    i = 0
    while (!++<NUM_ITERATIONS)do
        Shuffle the list of paths.
        while (!End of List of Paths) do
            Pick an unpicked pair from the List, (Let paths i,j are picked.)
            $S_{ij} = x_i + x_j$
            $S = s_{ij}$ + extraCapacity
            $LO_i = \max(l_i, S − h_j)$
            $HI_i = \min(h_i, S − l_j)$
            $LO_j = S − HI_i$
            $HI_j = S − LO_i$
            $x_i = LO_i + (HI_i − LO_i − \text{extraCapacity})/2$
            $x_i = \max(\min(x_i, s_{ij}), 0)$
            $x_j = s_{ij} − x_i$
       end while
    end while
end while

---

EXAMPLES

The examples set forth below serve to provide further appreciation of the invention but are not meant in any way to restrict the scope of the invention.

The examples illustrate the performance of the different approaches for the static case. The results were generated using simulations in which the true available capacities on paths i=0, . . . , P are chosen randomly by choosing a set of random variable $z_i \sim U(0,1)$, (that is, uniformly on the interval (0,1)), and then setting the capacities to be $$c_i = \omega \times \frac{z_i x_0(0)}{\sum_{i=1}^{P} z_i},$$

where the number of available paths, $\omega$ is a tunable parameter in order to allow the size of the feasible region to be varied. In the continuous case, when the number of available paths equals one ($\omega=1$), there is exactly enough capacity to allow all of the traffic to be carried; when the number of available paths is greater than one ($\omega \geq 1$) a feasible solution exists, and when the number of available paths is less than one ($\omega<1$), no feasible solution exists. In the discrete case, the capacity, $c_i$, is also discretized, so that the number of available paths ($\omega$) no longer has the same strict relationship to the feasibility of the solution.

Where not otherwise specified, initial estimates are generated for $l_i=0$ and $h_i$ by a random variable distributed between the maximum capacity of any path, and the load to be distributed, for example $$h_i = h \sim U(c_{max}, x_0(0)), \forall i=1, \ldots, P.$$

Results for different allocation strategies are presented as the number of available paths ($\omega$) and the accuracy of initial measurements of pinning intervals ($\alpha$) vary. The results are also presented for the worst case performance of these allocation strategies. The performance metrics of interest are convergence time and total cost incurred. The results presented in the examples show the convergence times and total costs over 1,000 simulations.

In all of the results, the discretized version is used, with B=1, and the initial load $x_0(0)$ is varied rather than B. An equivalent approach would be to fix $x_0(0)$, and vary 1/B in the same way.

Example 1

Comparison of Various Allocation Strategies

This example compares the different allocations strategies: proportional allocation, linear-search, bisection search, exponential search and multidimensional iterative bisection search (MIBS). FIGS. 2A-B and FIGS. 3A-B show comparisons of these strategies, through both the convergence time and the total cost. The graphs show box plots giving the mean, quartiles, and extreme values of the 1,000 simulations, for a range of values for the number of available paths ($\omega$). The results clearly show that the linear and exponential approaches are much worse than any alternative. This is because these schemes are conservative in their approach, i.e., they do not cause congestion on any uncongested path, and thus incur high cost by not easing the congestion on the congested path.

For a small number of available paths ($\omega$)), the bisection approach is also significantly worse than the proportional allocation and local search approach, which have very similar results. Given the additional complexity of the bisection approach, over straight proportional allocation, it does not provide any advantages. Also, the performance of MIBS is the same or marginally better than that of proportional allocation. Therefore, the MIBS and proportional allocation strategies are preferred.

Example 2

Figure 4A:
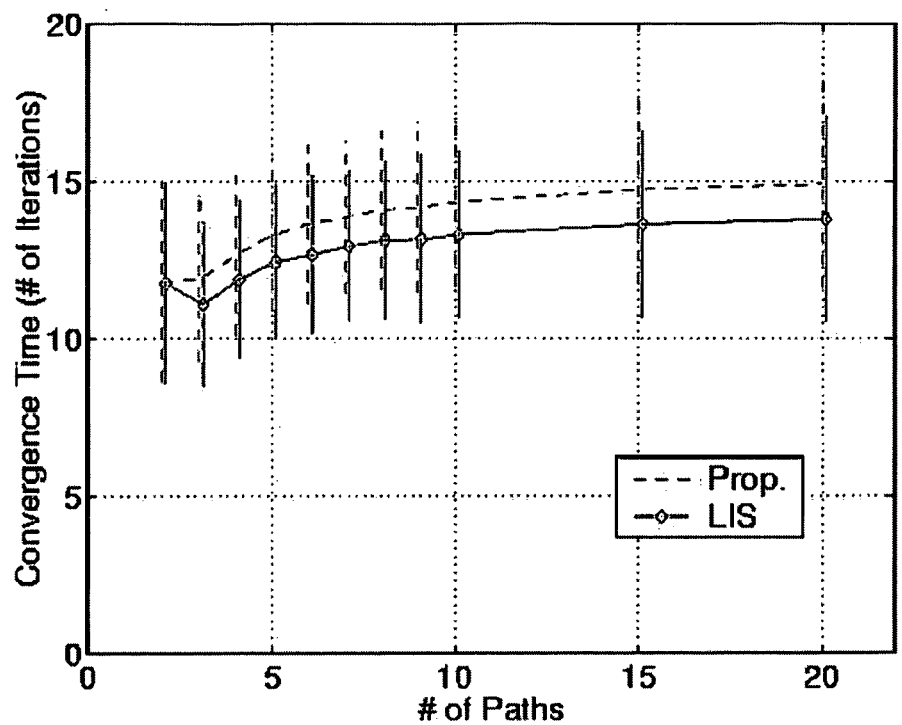
FIG. 4A is a graph showing a comparison of different search schemes for varying numbers of paths based on convergence time when $x_0=10,000$ and $\omega=1.00$.
Figure 4B:
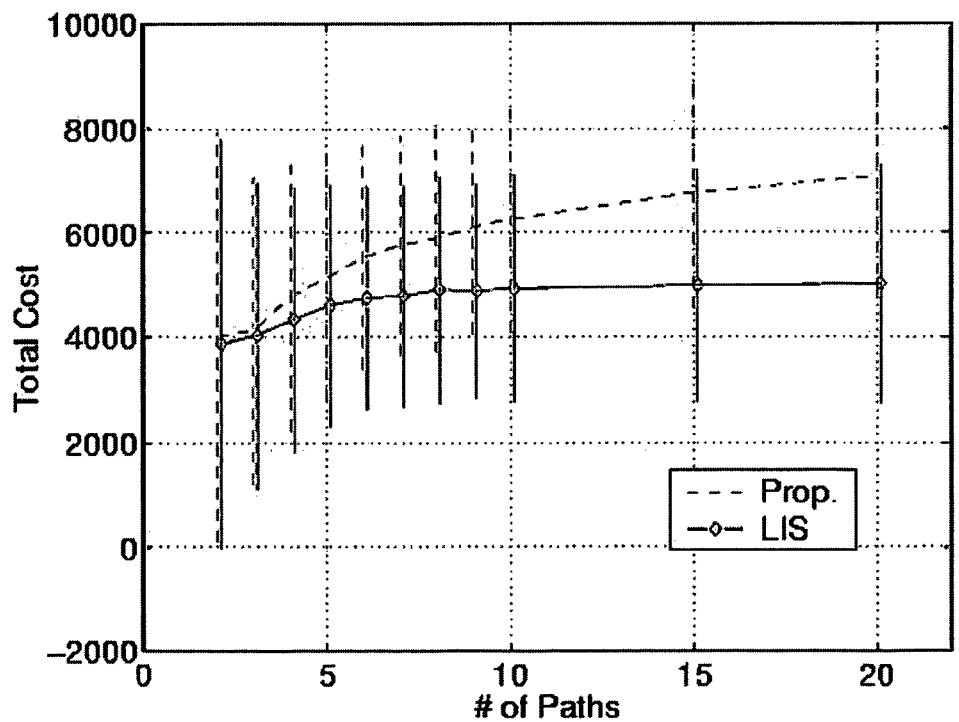
FIG. 4B is a graph showing a comparison of different search schemes for varying numbers of paths based on total cost when $x_0=10,000$ and $\omega=1.00$.
Figure 5A:
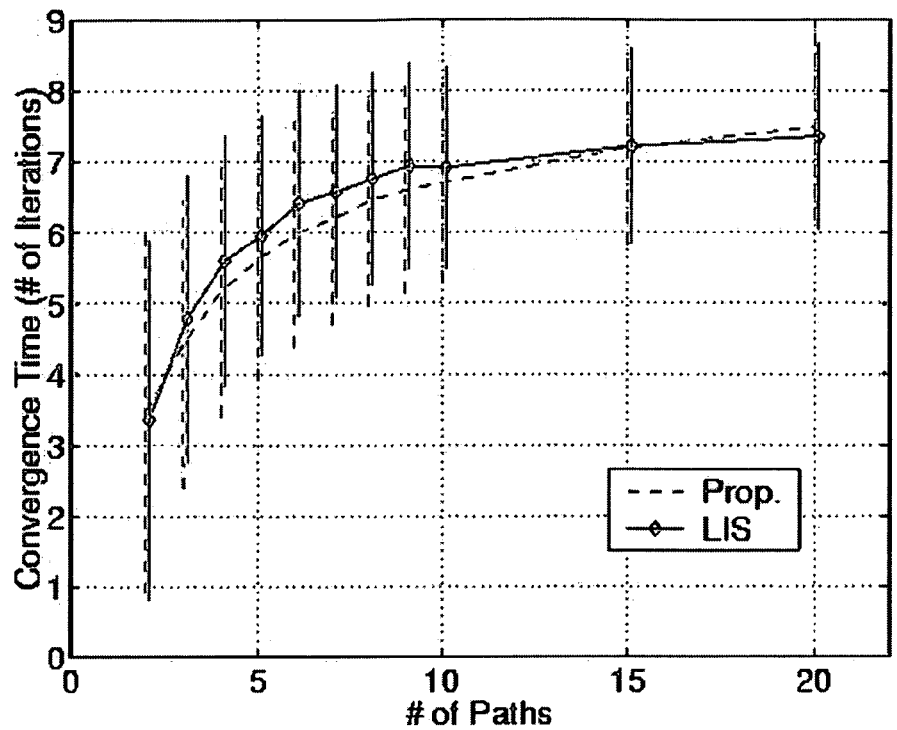
FIG. 5A is a graph showing a comparison of different search schemes for varying numbers of paths based on convergence time when $x_0=10,000$ and $\omega=1.05$.
Figure 5B:
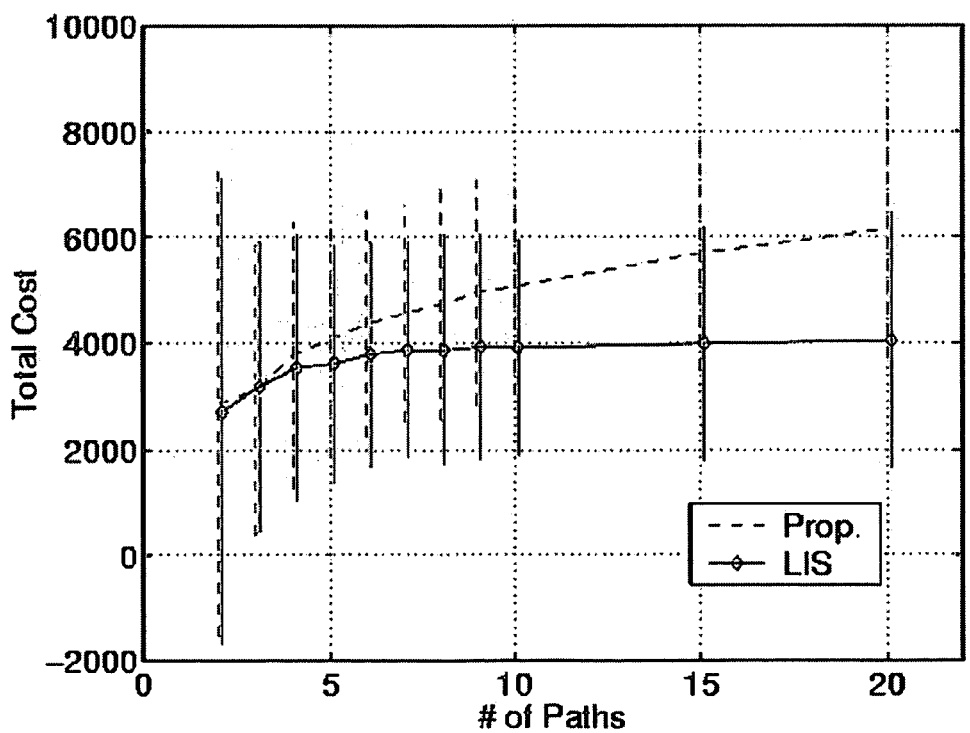
FIG. 5B is a graph showing a comparison of different search schemes for varying numbers of paths based on total cost when $x_0=10,000$ and $\omega=1.05$.
Figure 6A:
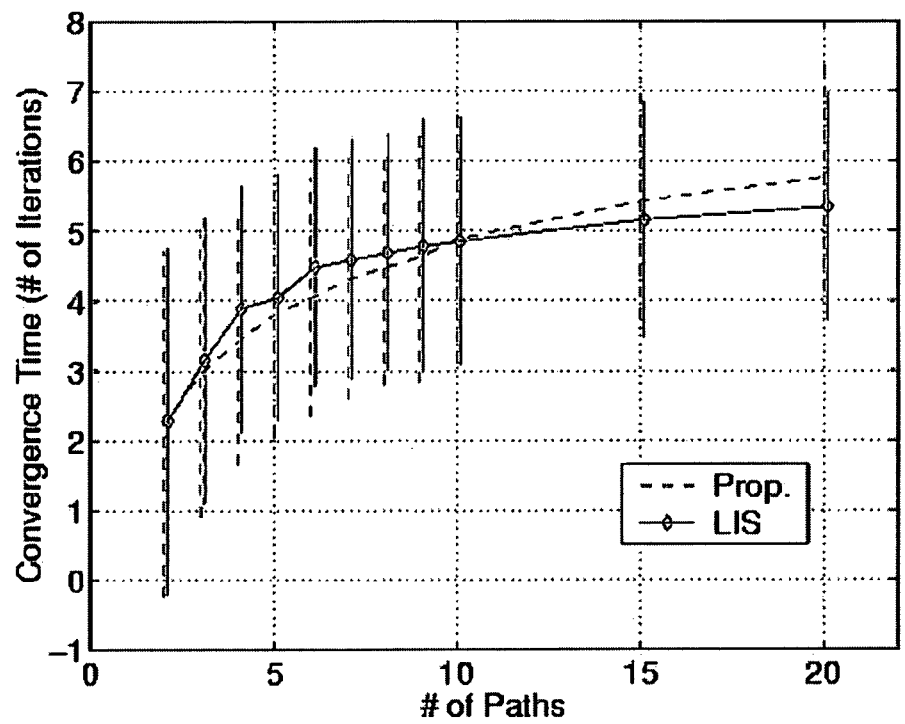
FIG. 6A is a graph showing a comparison of different search schemes for varying numbers of paths based on convergence time when $x_0=19,000$ and $\omega=1.20$.
Figure 6B:
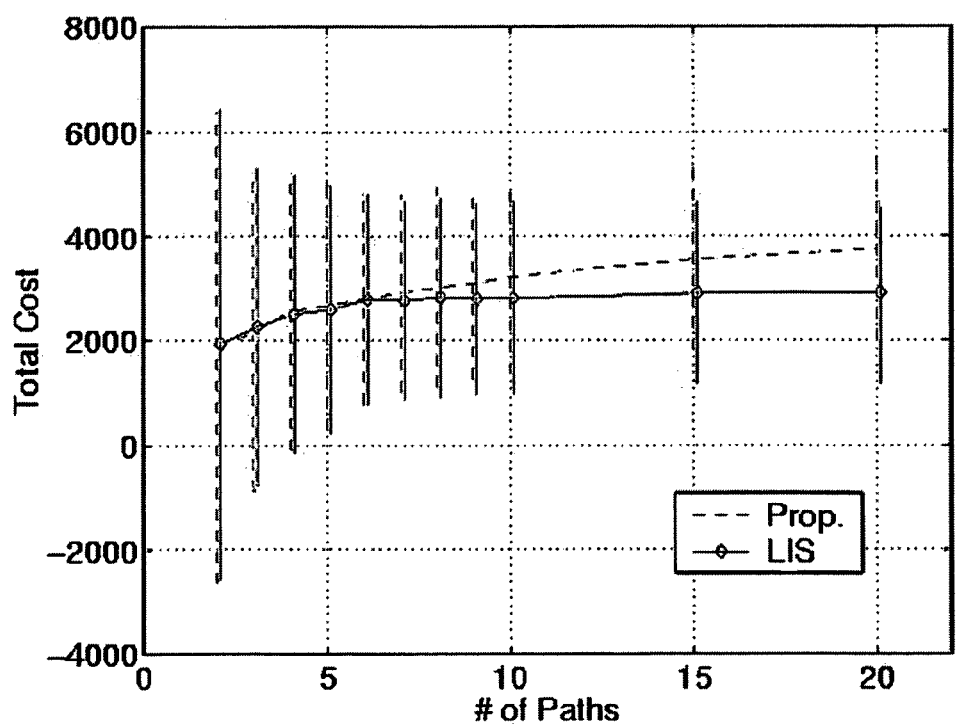
FIG. 6B is a graph showing a comparison of different search schemes for varying numbers of paths based on total cost when $x_0=10,000$ and $\omega=1.20$.

Comparisons of Different Allocation Strategies for Variable Number of Alternate Paths This example studies the proportional allocation and the multidimensional iterative bisection search (MIBS) approaches. In this example, the total number of alternate paths that are available varied from 2 to 20 for a constant path load, $x_0(0)=10,000$. The number of available paths, $\omega$, also varied from 1.0 to 1.2. FIGS. 4 to 6 show the results—giving the average values as points, and the 95 percentiles of the distribution of results as vertical bars. The results indicate, both algorithms have similar performance vis-a-vis convergence time. However, MIBS outperforms the other strategies when the total cost is considered as a performance metric, particularly for large numbers of paths. Also, it is interesting to note that the cost and the convergence times increase as the total number of available paths increases, except for the MIBS with respect to cost, which reaches a peak, and then stays there.

Example 3

Accurate Measurements of the Pinning Interval

Figure 7A:
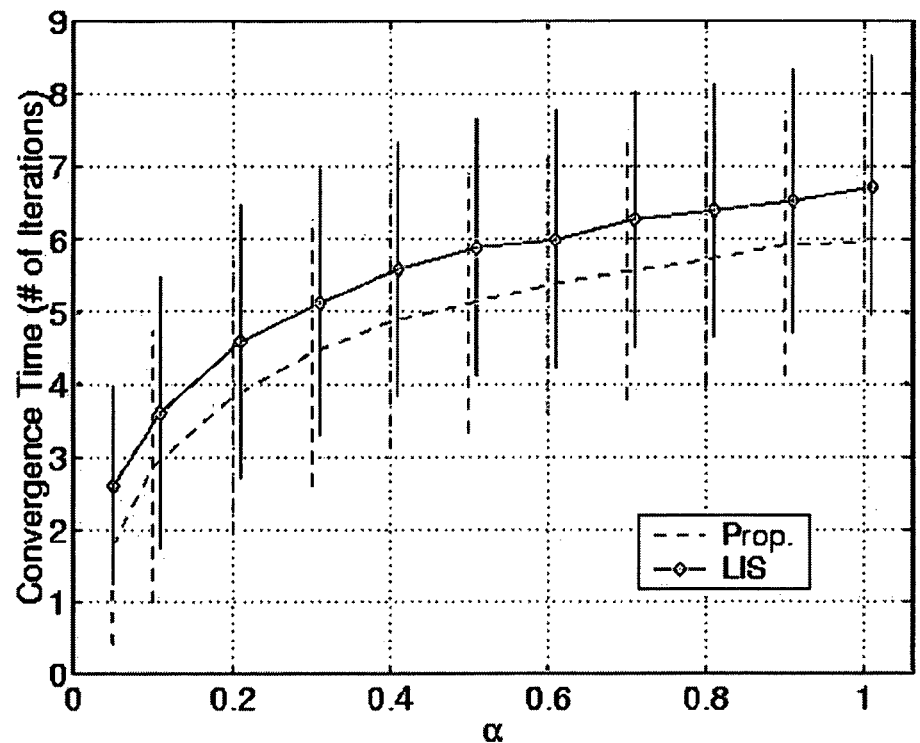
FIG. 7A is a graph showing a comparison of different search schemes for different prior estimates of the pinning interval, $\alpha$, based on convergence time when $x_0=10,000$ and $\omega=1.01$.
Figure 7B:
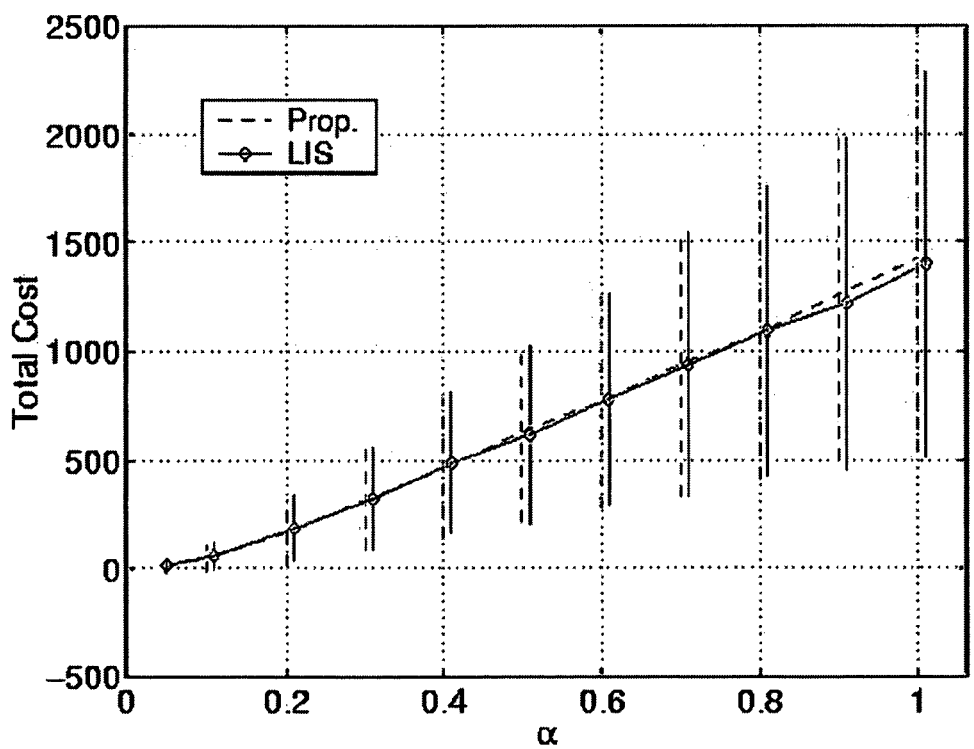
FIG. 7B is a graph showing a comparison of different search schemes for different prior estimates of the pinning interval, $\alpha$, based on total cost when $x_0=10,000$ and $\omega=1.01$.

This example compares the approaches to allocation when more accurate measurements for the initial pinning interval, $\alpha$, are available. In the simulations, this was tested by drawing the lower and higher thresholds of the pinning interval as $$l_i(0) \in U[(1-\alpha)c_i, c_i] \text{ and}$$

$$h_i(0) \in U[c_i, c_i(1-\alpha)]$$

for different values of $\alpha$. Specifically, the pinning interval, $\alpha$, was varied from 0.05 to 1. FIG. 7 shows the results. The proportional allocation strategy converges faster than MIBS though the difference in convergence times is less than 1 iteration. Also, the results suggest that convergence times as well as total costs decrease as the value of the pinning interval, $\alpha$, decreases. This is intuitive as a decreasing value of pinning intervals, $\alpha$, suggests that we have more accurate estimates of the pinning interval, $\alpha$, especially the lower bounds.

Example 4

Figure 8A:
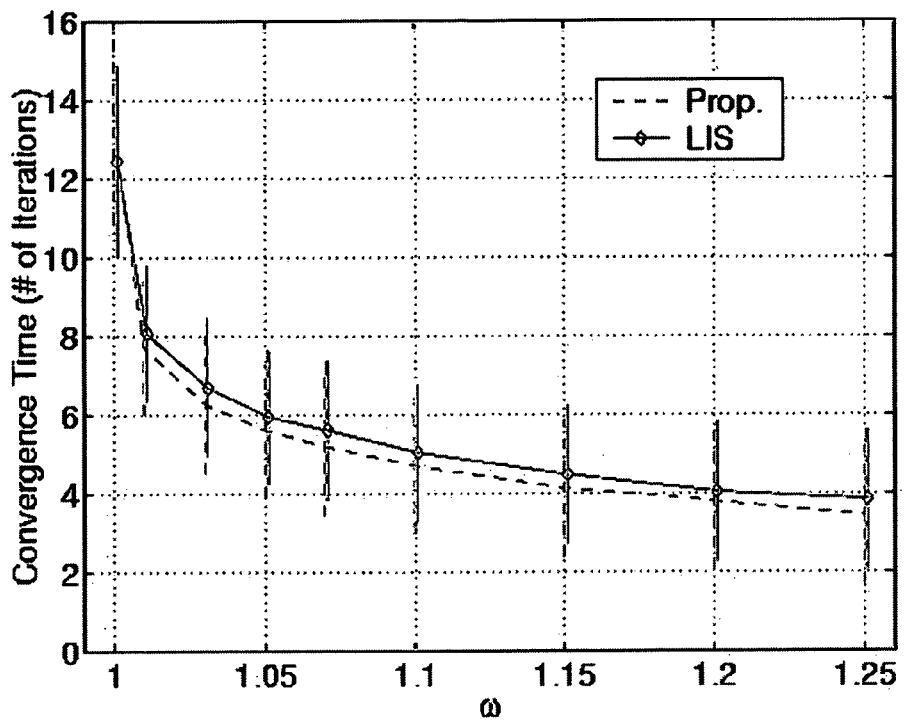
FIG. 8A is a graph showing a comparison of different search schemes for different available capacity for five (5) alternate paths based on convergence time when $x_0=10,000$.
Figure 8B:
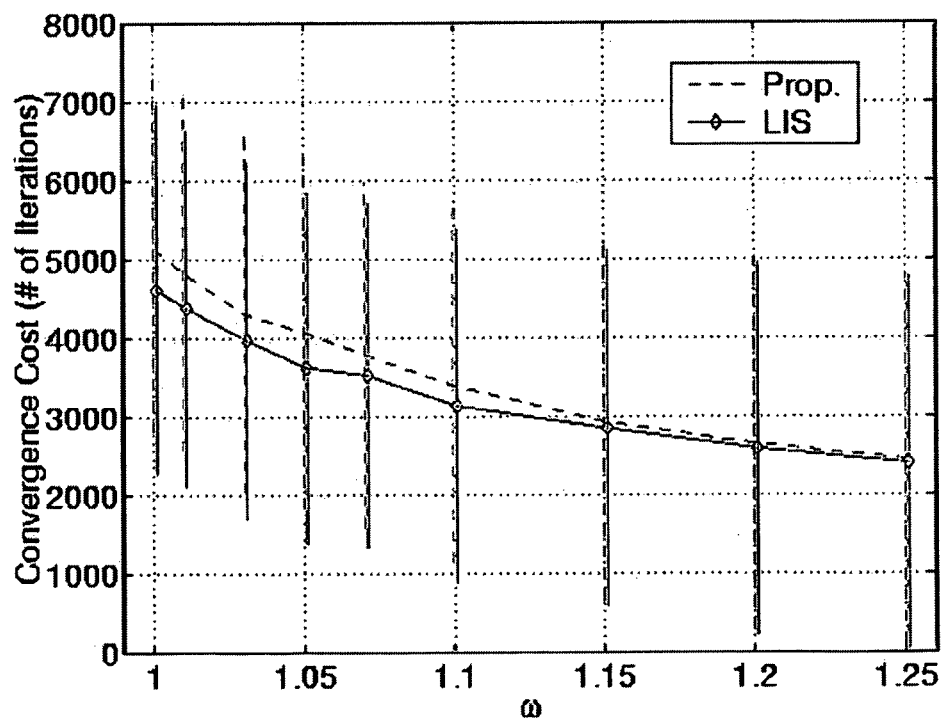
FIG. 8B is a graph showing a comparison of different search schemes for different available capacity for five (5) alternate paths based on total cost when $x_0=10,000$.
Figure 9A:
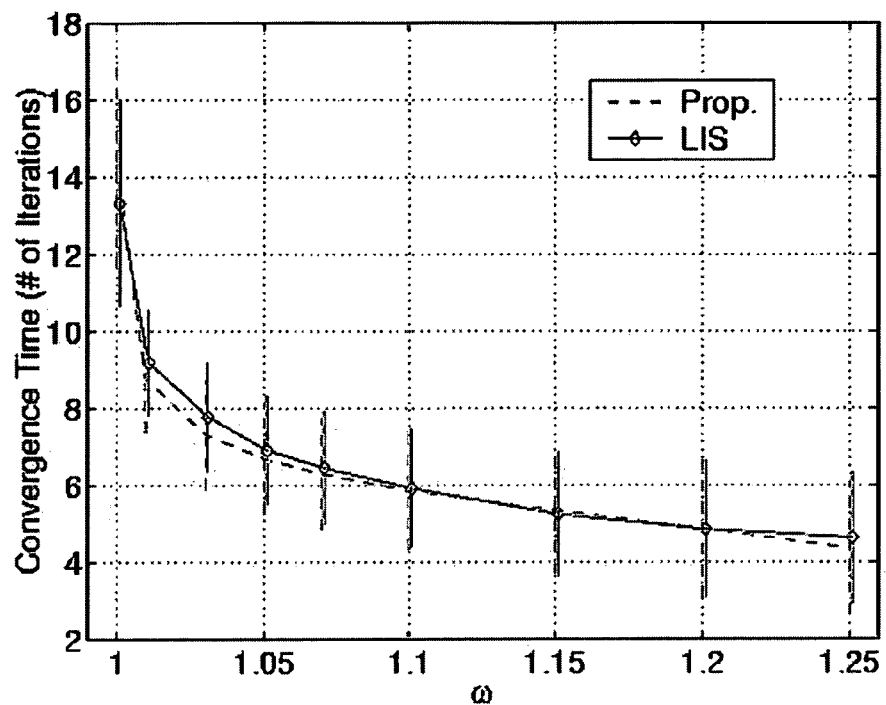
FIG. 9A is a graph showing a comparison of different search schemes for different available capacity for ten (10) alternate paths based on convergence time when $x_0=10,000$.
Figure 9B:
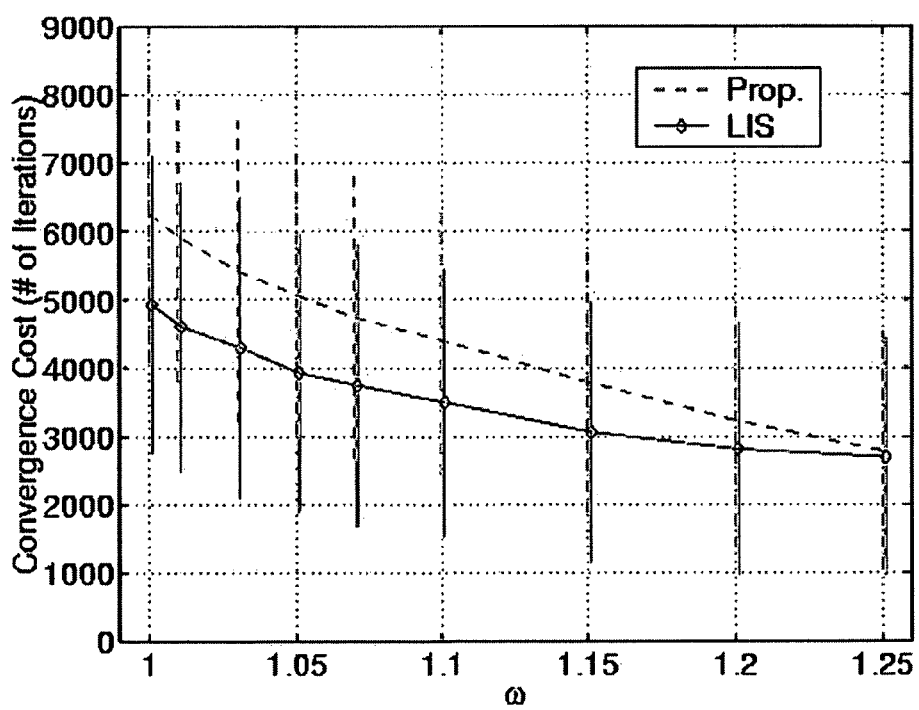
FIG. 9B is a graph showing a comparison of different search schemes for different available capacity for ten (10) alternate paths based on total cost when $x_0=10,000$.
Figure 10A:
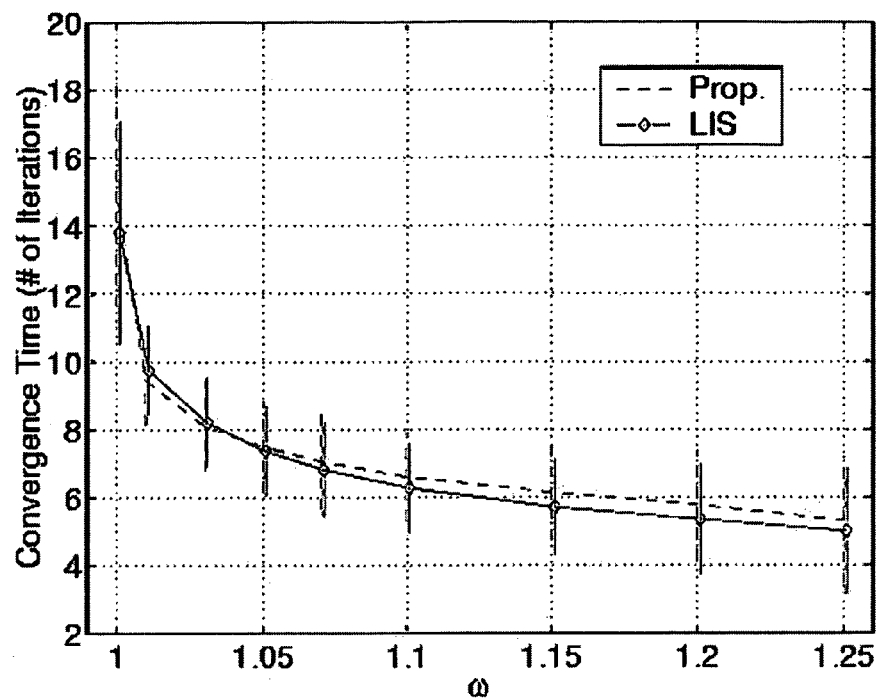
FIG. 10A is a graph showing a comparison of different search schemes for different available capacity for twenty (20) alternate paths based on convergence time when $x_0=10,000$.
Figure 10B:
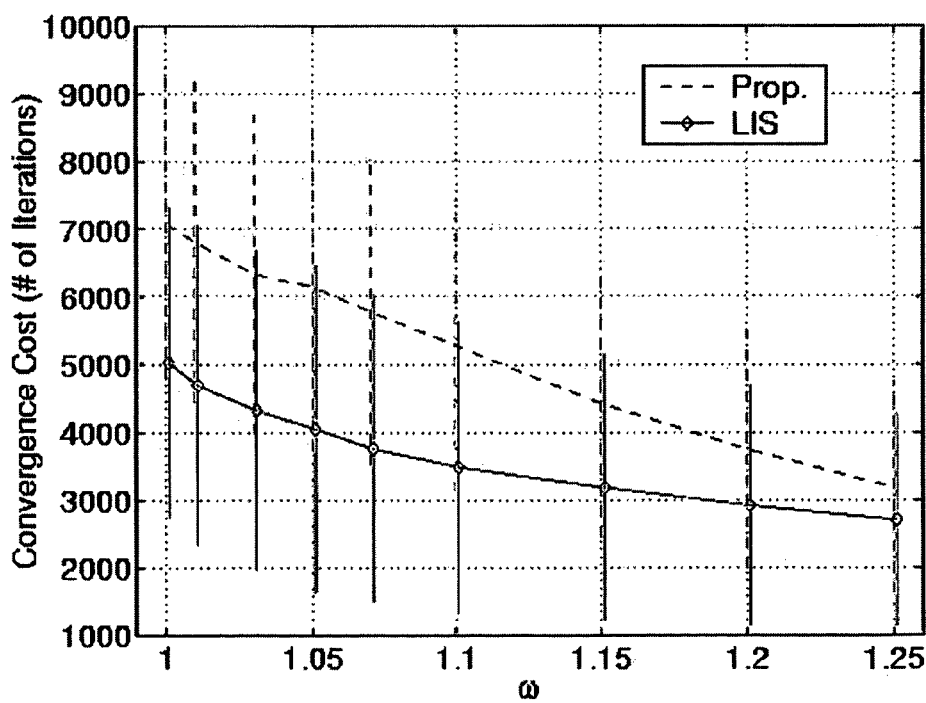
FIG. 10B is a graph showing a comparison of different search schemes for different available capacity for twenty (20) alternate paths based on total cost when $x_0=10,000$.
Figure 11A:
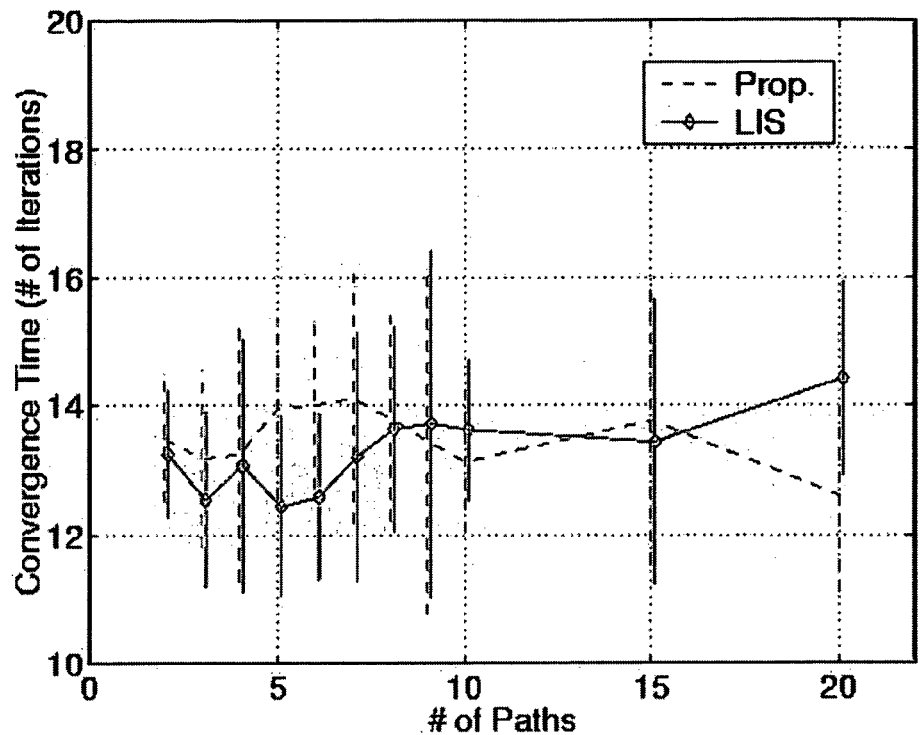
FIG. 11A is a graph showing a worst case comparison of different search schemes for varying numbers of paths based on convergence time when $x_0$=10,000 and $\omega$=1.00.
Figure 11B:
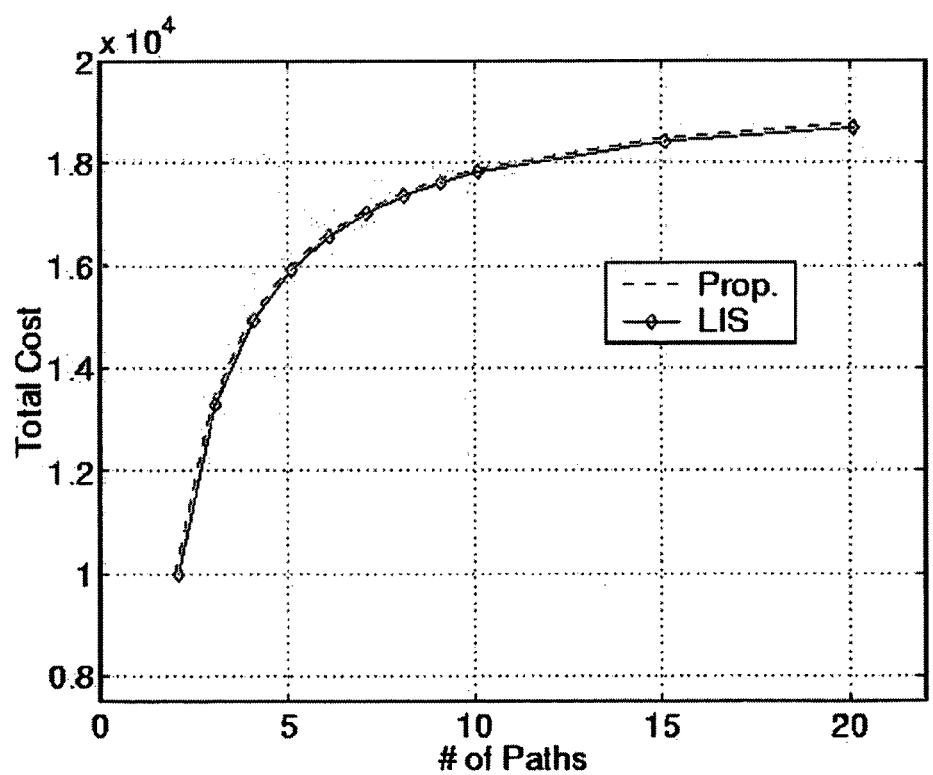
FIG. 11B is a graph showing a worst case comparison of different search schemes for varying numbers of paths based on total cost when $x_0$=10,000 and $\omega$=1.00.
Figure 12A:
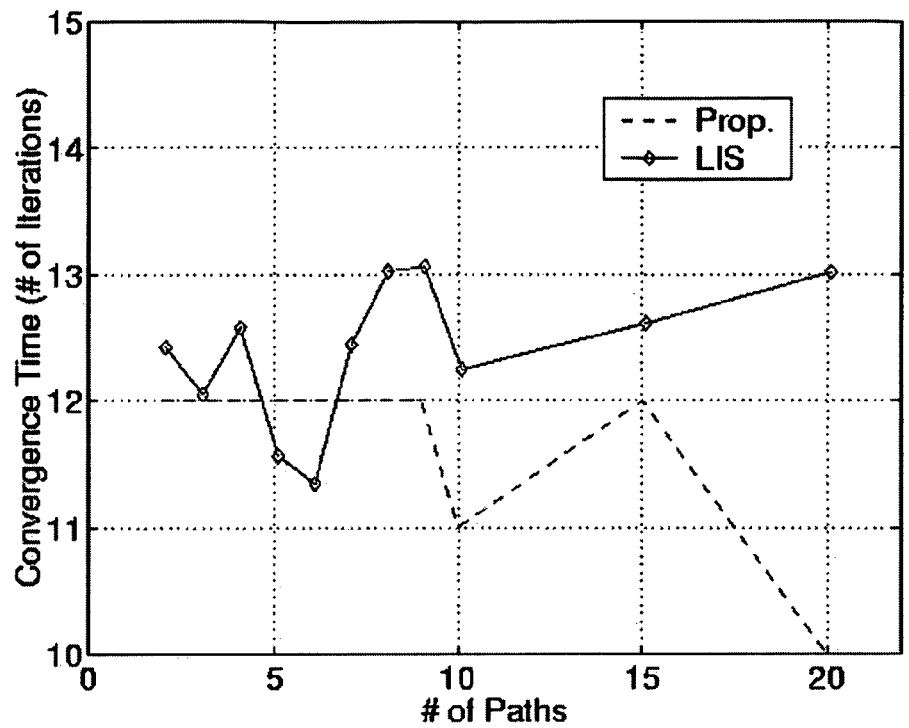
FIG. 12A is a graph showing a worst case comparison of different search schemes for varying numbers of paths based on convergence time when $x_0$=10,000 and $\omega$=1.10.
Figure 12B:
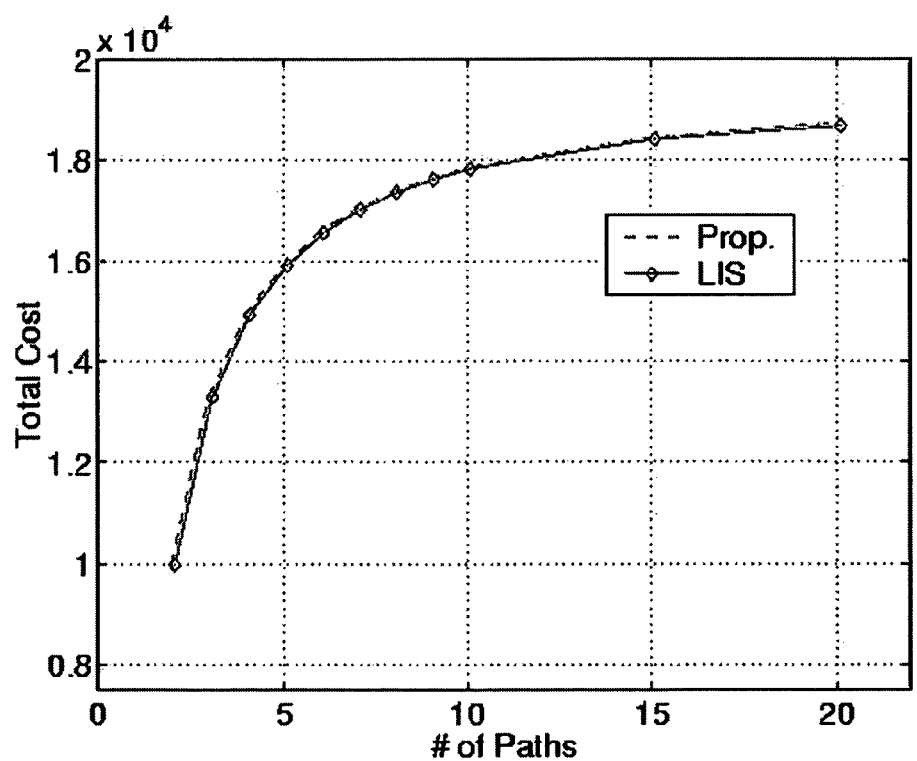
FIG. 12B is a graph showing a worst case comparison of different search schemes for varying numbers of paths based on total cost when $x_0$=10,000 and $\omega$=1.10.

Performance of Different Allocation Strategies for Different Values of Available Capacity This example presents the results for the performance of the proportional and multidimensional iterative bisection search (MIBS) strategies for different values of available capacities. For all the experiments, the total initial load, $x_0(0)$, was maintained at a constant value of 10,000 and the total available capacity was varied from 10,000 to 12,500 by varying the number of available paths, $\omega$. The total number of paths available was also varied from 2 to 20. However, FIGS. 8A-B, 9A-B and 10A-B show the results for only 5, 10 and 20 paths. These figures show that, as the available capacity increases, the convergence time and the total cost incurred decreases. This is because greater available capacity implies a bigger feasible region and, thus, it is easier and faster to find a feasible solution. FIGS. 8 to 10 also show that, as the available capacity increases, MIBS outperforms the proportional scheme. Moreover, the gains are more significant if the number of available paths is larger.

Example 5

Focused Capacity Performance of Different Allocation Strategies

In this example, the performance of the three schemes was compared when the available capacity is focused on one alternative path. The conditions for the tests included a constant initial load ($x_0(0)$) and a given number of available paths (P), with a total available capacity $c=x_0(0)$, P−1 paths with capacity $c_i=1$, and one path with $c_i=c-n+1$ units of available capacity. FIGS. 11A-B and 12A-B show the results of these tests.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A method for balancing traffic across paths connecting a network to the Internet comprising:

forming a connection between a home network and a large network which connects to a plurality of networks, wherein the connection comprises a plurality of paths (p), carrying traffic in the form of data packets between the home network and the large network, wherein each path has a path load ($x_i$), which is the amount of traffic allocated to a path (p), an available capacity ($c_i$), which is the amount of traffic that the path (p) can transmit, and a low capacity boundary ($l_i$) and a high capacity boundary ($h_i$), which are the measured high and low capacity bounds of the available capacity ($c_i$);

measuring the path load ($x_i$) of each of the plurality of paths (p);

measuring the high capacity boundary ($h_i$) of each of the plurality of paths (p);

comparing the path load ($x_i$) and the high capacity boundary ($h_i(0)$) for each of the plurality of paths (p);

selecting one of the plurality of paths (p), wherein the plurality of paths (p) comprises the selected path ($p_0$) and other paths ($p_i$), wherein the selected path ($p_0$) has an initial overload ($x_0(0)$), and wherein the overload exists when the initial selected path load ($x_0$) is greater than the initial selected path high capacity boundary ($h_0$); and choosing the path load ($x_i$) for each of the plurality of other paths ($p_i$) using a fractional allocation strategy, wherein the fractional allocation strategy comprises:

(a) indexing the other paths ($p_i$) by i, wherein i is a set of integers from 1 to P, wherein P is the total number of other paths ($p_i$);

(b) associating a plurality of pinning intervals with a counter (t), wherein the initial value of the counter is set to zero (t=0) and there are a total of N pinning intervals;

(c) calculating a portion (y(t)) of the initial selected path overload ($x_0(0)$) to be off-loaded and distributed to the other paths ($p_i$) using a bi-sectional search strategy and skipping to step (f);

(d) calculating an updated selected path overload ($x_0(t)$), wherein the updated selected path overload ($x_0(t)$) is equal to the initial selected path overload ($x_0(0)$) less the sum of the low capacity boundary for i path(s);

(e) calculating the portion (y(t)) of the updated selected path load ($x_0(t)$) to be off-loaded and distributed to the other paths ($p_i$) using a bi-sectional search strategy;

(f) measuring the low capacity boundary ($l_i$) and the high capacity boundary ($h_i$) of the other paths ($p_i$) at pinning interval (t);

(g) distributing the portion (y(t)) of the initial selected path overload or the updated selected path load ($x_0(t)$) to the other paths ($p_i$), wherein the portion of the traffic (y(t)) is distributed to the other paths ($p_i$) using the equation $$x_i = l_i(t) + \frac{h_i(t) - l_i(t)}{\sum_{i=1}^{P}(h_i(t) - l_i(t))}$$

and (h) stopping if there are no more pinning intervals (t=N), otherwise increasing the numerical value of the counter by one (1) and go to step (d).

2. The method for balancing traffic across paths connecting a network to the Internet according to claim 1, wherein the bi-sectional search strategy chooses the portion (y(t)) of the traffic to be off-loaded and distributed using the equation:

$$y(t) = \min\left\{(0.5)\left[\sum_{i=1}^{P}(h_i(t) - l_i(t))\right], (x_0(t))\right\}.$$

3. The method for balancing traffic across paths connecting a network to the Internet according to claim 1, wherein the amount of traffic from the home network to the large network over the selected path ($p_0$) is measured using flow level measurements or Simple Network Management Protocol (SNMP).

4. The method for balancing traffic across paths connecting a network to the Internet according to claim 1, wherein the initial selected path high capacity boundary ($h_0(0)$) is measured using active probes, or passive measurements of traffic details.

5. The method for balancing traffic across paths connecting a network to the Internet according to claim 1, wherein the initial selected path high capacity boundary ($h_0(0)$) is measured using Transmission Control Protocol (TCP) Synchronize/Acknowledgement (SYN/ACK) response time.

6. The method for balancing traffic across paths connecting a network to the Internet according to claim 1, wherein the initial selected path high capacity boundary ($h_0(0)$) is measured using Round Trip Time (RTT), and loss measurements.

7. The method for balancing traffic across paths connecting a network to the Internet according to claim 1, wherein the initial selected path low capacity boundary ($l_0(0)$ is equal to 0 and the initial selected path high capacity boundary ($h_0(0)$) is equal to 1.

* * * * *